United States Patent Office

3,487,126
Patented Dec. 30, 1969

3,487,126
COMPOSITION PREPARED FROM POLYVINYL
CHLORIDE AND A CURED POLYURETHANE
Russell P. Carter, Jr., Stow, Ohio, assignor to The Goodyear Tire & Rubber Company, Akron, Ohio, a corporation of Ohio
No Drawing. Filed Sept. 25, 1967, Ser. No. 670,379
Int. Cl. C08g 41/04
U.S. Cl. 260—859                                  8 Claims

ABSTRACT OF THE DISCLOSURE

A composition, and a method for its preparation, having improved tear resistance, prepared by the method which comprises removing the solvent from a solution comprising a polyvinyl chloride having an inherent viscosity of from about 0.7 to about 1.3, a cured polyurethane, and a solvent therefor.

---

This invention relates to a composition prepared from polyvinyl chloride and a cured polyurethane and to a method of preparing the composition.

Various admixtures of polyvinyl chloride and polyurethanes can be prepared which have useful physical properties. For example, polyvinyl chloride generally has poor tear resistance and cured polyurethanes generally have good tear resistance. Heretofore, mixtures of polyvinyl chloride and various polyurethanes have been made which have improved tear resistance. However, the tear resistance is little, if any, improved when compared to the tear resistance of the polyurethane.

Therefore, it is an object of this invention to provide a composition from polyvinyl chloride and a cured polyurethane having a substantially improved tear resistance and to provide a method of preparing such a composition.

In accordance with this invention it has been found unexpectedly that a composition having improved tear resistance is prepared by the method which comprises removing the solvent from a solution comprising polyvinyl chloride, a cured polyurethane and a solvent therefor, where the polyvinyl chloride has an inherent viscosity of from about 0.7 to about 1.3 and where the cured polyurethane is prepared by the method which comprises reacting from about 1.5 to about 1.7 mols of an organic diisocyanate with a mixture which comprises from about 0.4 to about 0.6 mol of a hydrocarbon diol having from 2 to about 10 carbon atoms and having terminal hydroxyl groups, from about 0.03 to about 0.05 mol of a diamino diphenyl sulfone, and 1.0 mol of a polymeric polyester which is the condensation reaction product of 1,4-butanediol and adipic acid and having a molecular weight of from about 700 to about 1500 and an acid number of less than about 10, wherein the isocyanate groups of the diisocyanate are equal to from about 92 to about 97 percent of the total reactive hydrogens supplied by the polymeric polyester, the hydrocarbon diol, and the diamino diphenyl sulfone, and curing the reaction mixture.

The invention was particularly unexpected since compositions prepared by dry blending polyvinyl chloride with such cured polyurethanes were found to have essentially no unexpected improvement in tear strength.

The improved compositions of this invention are those wherein from about 75 to about 400 parts by weight of polyvinyl chloride are used per 100 parts by weight of the cured polyurethane. In general, such compositions containing less than about the 75 parts by weight and above about the 400 parts by weight of polyvinyl chloride have a tear strength which is somewhat improved over that of the cured polyurethane although the amount of tear strength improvement is about the amount which might be expected.

Preferably the polyvinyl chloride used in this invention has an inherent viscosity of from about 0.70 to about 1.3. The inherent viscosity of the polyvinyl chloride is measured in cyclohexanone by ASTM Test D1243-60 Method A.

In the practice of this invention at least one of the cured polyurethanes are mixed in solution with the polyvinyl chloride by well-known methods of solution mixing. For example, the polyvinyl chloride can be dissolved in a solution of at least one of the cured polyurethanes or at least one of the cured polyurethanes can be dissolved in a solution of the polyvinyl chloride. In the alternative, a solution of at least one cured polyurethane can be mixed with a solution of the polyvinyl chloride or the cured polyurethane and polyvinyl chloride can be simultaneously or incrementally dissolved in a solvent. As a further alternative, the polyvinyl chloride and the cured polyurethane can be dry blended and subsequently dissolved in the solvent.

Solutions of the mixture are preferably prepared which contain from about 10 to about 25 percent by weight of the polyvinyl chloride-cured polyurethane mixture. Higher or lower concentrations can also be used depending upon the inherent viscosity of the polyvinyl chloride, the solvent used, and the intended application of the mixture such as concentrations of from about 5 to about 30 percent by weight. If desired, the solutions can be formed at about 20° C. to about 50° C. or at higher temperatures above 50° C. such as from about 50° C. to 100° C. or higher although it is usually desired to form the solutions below the boiling point of the solvent used. Lower temperatures can also be used to prepare the solutions but the rate of solution is usually unnecessarily slow. The solutions can be formed at atmospheric pressure or above or below atmospheric pressure.

In the practice of this invention solvents can be used for the polyvinyl chloride and cured polyurethane which are solvents generally known to those skilled in the art which form solutions with polyvinyl chlorides having inherent viscosities of from about 0.7 to about 1.3 concentrations of at least 5 parts by weight of polyvinyl chloride per 95 parts by weight of solvent. Representative examples of the various solvents are ketones such as methyl ethyl ketone, and methyl isobutyl ketone; cyclic ketones such as cyclohexanone, methylcyclohexanone, and isophorone; esters such as ethyl acetate and butyl acetate; nitrobenzene, chlorobenzene, dioxane, tetrahydrofuran, N-methyl - 2 - pyrolidone, N,N-dimethylformamide and their mixtures. Other diluents such as dimethyl sulfoxide can be used with the solvents. For this invention it is preferred that a solution of the polyvinyl chloride and cured polyurethane is formed. Because some of the solvents hereinbefore described form gels rather than solutions with the polyvinyl chlorides at room temperatures at concentrations of at least 5 percent by weight, it is understood that solutions will be formed with some of the solvents at temperatures somewhat higher than about 25° C.

The solutions of the compositions of this invention can be dried to form products having an improved tear resistance. If desired, the compositions of this invention can be formed into various films, coatings, and shapes. They can be used as adhesives for adhering polyurethanes to polyvinyl chlorides. The solutions can be dried by well-known methods such as air drying at 20° C. to 100° C. or higher for several minutes to several hours. The compositions can be used, for example, to provide protective coatings for electrical conductors and for substrates which are subject to sudden high impacts.

In the preparation of the cured polyurethanes of this invention it is usually more preferable to adjust the ratio of the reactants so that the isocyanate groups of the diisocyanate are equal to from about 94 to about 97 percent of the total reactive hydrogens supplied by the polymeric polyester, the hydrocarbon diol, and the diamino diphenyl sulfone. The reactive hydrogens are supplied by hydroxyl groups and amino groups.

Thus, it is an important feature of the preparation of the polyurethanes of this invention that in addition to reacting certain amounts of certain materials, a particular order of addition is important in that it is preferred that first a mixture is prepared of the polyester, hydrocarbon diol, and the sulfone diamine and then the organic diisocyanate is added to the mixture.

Various hydrocarbon diols and mixtures of diols can be used to prepare the polyurethanes of this invention. Representative of such diols are ethylene glycol, 1,4-butane diol, 1,5-pentane diol, and 1,6-hexane diol.

It is generally preferred that the diamine curatives of this invention can be diamino diphenyl sulfones. Representative of such sulfones are 4,4'-diamino diphenyl sulfone and 3,3-diamino diphenyl sulfone.

Various diisocyanates can be used in preparing the polyurethanes. Representative of such diisocyanates are 4,4'-diphenyl methane diisocyanate and 4,4'dicyclohexyl methane diisocyanate.

In the practice of this invention, if desired, the mixture of the polyester, hydrocarbon diol, and sulfone diamine may be heated to reduce its viscosity before adding the diisocyanate. After the addition of the diisocyanate, the polymerization reaction is generally carried out over a period of from about a minute up to an hour or more. Generally a reaction time of from about 1 to about 10 minutes is sufficient to prepare the polymeric poly urethanes of this invention. The temperature of the polymerization reaction is not critical and can be varied over a wide range. Suitable reaction temperatures are from about 60° C. to about 100° C., although higher or lower temperatures can be used. Also, the reaction pressure is not critical and may be atmospheric or above or below atmospheric pressure.

The resulting polyurethane is then heated to effect the cure. It is generally preferred that the polyurethane is cured in an inert and dry atmosphere. A temperature of from about 100° C. to about 200° C. for about 10 minutes to about 6 hours at about atmospheric pressure is generally sufficient to effect the cure although higher or lower pressures can be used.

The cured polymeric polyurethanes used in this invention have superior physical properties and yet surprisingly can be dissolved in the suitable solvents for the polyvinyl chlorides. Such cured polymeric polyurethanes can have ultimate tensile strengths of from about 3000 to about 7500 pounds per square inch with elongations of from about 600 to about 800 percent.

The following example further illustrates this invention. The parts and percentages are by weight unless otherwise indicated.

Example

In a suitable container was dissolved 20 parts of a cured polyurethane in 80 parts of tetrahydrofuran by mixing the cured polyurethane with the tetrahydrofuran for about 16 hours at about 25° C.

In another suitable container was dissolved 15 parts of particulate polyvinyl chloride (having an inherent viscosity of about 1.05–1.11 according to ASTM Method D1243 obtained from The Dow Chemical Company) in 85 parts of tetrahydrofuran by mixing the polyvinyl chloride and tetrahydrofuran for about 60 minutes at about 55° C.

A series of mixtures containing various ratios of these two solutions were made, cast onto glass plates and dried at about 25° C. for about 12–16 hours to form films having a thickness of 0.003 inch, and for the purposes of this specification numbered from 1 to 14. Crescent tear tests were preformed on the films according to ASTM Method D–624–54 and D–1004–61. The results of the crescent tear tests in pounds per inch are shown in Table 1.

For this example the cured polyurethane was prepared by the following method:

Into a suitable reactor was placed 100 parts of a polyester prepared by the condensation of 1,4-butane diol with adipic acid. This polyester had a hydroxyl number of approximately 100, an acid number of approximately 0.5, and a molecular weight of approximately 1000. The polyester was heated to 90° C. to liquify the polyester. The liquified polyester was stirred for one hour at 90° C. at a reduced pressure of about 5 to 10 millimeters of mercury absolute. The pressure was then adjusted to atmospheric pressure. To 5.43 parts of 1,4-butane diol, from which water had been removed by distilling 10 percent by weight of the diol, was added 0.95 part of 4,4'-diamino diphenyl sulfone. The 4,4'-diamino diphenyl sulfone was dissolved in the 1,4-butane diol at about 50° C. and the resulting solution added to the liquified polyester. The mixture was allowed to reach 80° C. At this time, 39.7 parts of 4,4'-diphenyl methane diisocyanate was added to the stirred mixture. The mixture was stirred for an additional 2 minutes and quickly poured into a pint can, and the pint can covered to maintain an inert atmosphere. The pint can had previously been pre-dried by heating to 110° C. The mixture in the pint can was cured by placing it in a hot air oven at 140° C. for 3½ hours.

TABLE I

| Film No. | Weight ratio of polyvinyl chloride to cured polyurethane | Crescent tear (lbs. per inch) | Ultimate elongation (percent) | Ultimate tensile strength (lbs. per sq. in.) | Melting point (° C.) |
| --- | --- | --- | --- | --- | --- |
| 1 | 0/100 | 321 | 620 | 3,485 | 113 |
| 2 | 1/4 | 337 | 693 | 3,932 | 148 |
| 3 | 1/2 | 404 | 500 | 5,880 | 172 |
| 4 | 3/4 | 559 | 382 | 6,098 | 156 |
| 5 | 1/1 | 610 | 373 | 7,189 | 172 |
| 6 | 4/3 | 554 | 405 | 7,250 | 180 |
| 7 | 3/2 | 621 | 265 | 5,409 | 183 |
| 8 | 2/1 | 721 | 312 | 6,400 | 187 |
| 9 | 3/1 | 736 | 258 | 5,967 | 180 |
| 10 | 4/1 | 666 | 259 | 5,561 | 185 |
| 11 | 10/1 | 340 | 4 | 9,400 | 196 |
| 12 | 15/1 | 225 | 66 | 4,780 | 203 |
| 13 | 20/1 | 196 | 163 | 5,125 | 208 |
| 14 | 100/0 | 208 | 7 | 5,939 | 208 |

As hereinbefore specified it is a critical feature that the composition of this invention is prepared from a solution of a polyvinyl chloride having an inherent viscosity of from about 0.7 to about 1.3 and a certain cured polyurethane. An additional critical feature of this invention is the specified ratios of the polyvinyl chloride to the cured polyurethane. With these critical features it was unexpectedly and surprisingly discovered that a composition is prepared having a tear resistance greatly improved in magnitude, particularly when compared to the composition prepared by dry blending the polyvinyl chloride and cured polyurethane such as mixing them on a mill.

While certain representative embodiments and details have been shown for the purpose of illustrating this invention, it will be apparent to those skilled in the art that various changes and modifications may be made therein without departing from the spirit or scope of the invention.

What is claimed is:

1. A composition having improved tear resistance prepared by the method which comprises removing the solvent from a solution comprising polyvinyl chloride, a cured polyurethane, and a solvent therefor, where the polyvinyl chloride has an inherent viscosity of from about 0.7 to about 1.3 and where the said cured polyurethane is prepared by the method which comprises reacting from about 1.5 to about 1.7 mols of an organic diisocyanate with a mixture which comprises from about 0.4 to about 0.6 mol of a hydrocarbon diol having from 2 to about 10 carbon atoms and having terminal hydroxyl groups, from about 0.03 to about 0.05 mol of a diamino diphenyl sulfone, and 1.0 mol of a polymeric polyester which is the condensation reaction product of 1,4-butanediol and adipic acid and having a molecular weight of from about 700 to about 1500 and an acid number of less than about 10, wherein the isocyanato groups of the diisocyanate are equal to from about 92 to about 97 percent of the total reactive hydrogens supplied by the polymeric polyester, the hydrocarbon diol, and the diamino diphenyl sulfone, and curing the reaction mixture said solution comprising from about 75 to about 400 parts by weight of the polyvinyl chloride per 100 parts by weight of the cured polyurethane.

2. A composition according to claim 1 wherein the organic diisocyanate is selected from the group consisting of 4,4'-diphenyl methane diisocyanate and 4,4'-dicyclohexyl methane diisocyanate.

3. A composition according to claim 2 wherein the sulfone diamine is selected from the group consisting of 4,4'-diamino diphenyl sulfone and 3,3'-diamino diphenyl sulfone.

4. A composition according to claim 3 wherein the solvent is capable of forming a solution with a polyvinyl chloride having an inherent viscosity of from about 0.7 to about 1.3 containing 5 parts by weight of the polyvinyl chloride per 95 parts by weight of the solvent.

5. A composition according to claim 4 wherein the hydrocarbon diol is selected from the group consisting of ethylene glycol, 1,4-butane diol, 1,5-pentane diol, and 1,6-hexane diol.

6. A composition according to claim 5 wherein the hydrocarbon diol is 1,4-butane diol.

7. A method of preparing the composition of claim 1 which comprises removing the solvent from a solution comprising polyvinyl chloride, a cured polyurethane and a solvent therefor, where the polyvinyl chloride has an inherent viscosity of from about 0.7 to about 1.3 and where the said cured polyurethane is prepared by the method which comprises reacting from about 1.5 to about 1.7 mols of an organic diisocyanate with a mixture which comprises from about 0.4 to about 0.6 mol of a hydrocarbon diol having from 2 to about 10 carbon atoms and having terminal hydroxyl groups, from about 0.03 to about 0.05 mol of a diamino diphenyl sulfone, and 1.0 mol of a polymeric polyester which is the condensation reaction product of 1,4-butanediol and adipic acid and having a molecular weight of from about 700 to about 1500 and an acid number of less than about 10, wherein the isocyanato groups of the diisocyanate are equal to from about 92 to about 97 percent of the total reactive hydrogens supplied by the polymeric polyester, the hydrocarbon diol, and the diamino diphenyl sulfone, and curing the reaction mixture said solution comprising from about 75 to about 400 parts by weight of the polyvinyl chloride per 100 parts by weight of the cured polyurethane and wherein the solvent is capable of forming a solution with the polyvinyl chloride containing 5 parts by weight of the polyvinyl chloride per 95 parts by weight of the solvent.

8. A method according to claim 7 wherein the organic diisocyanate is selected from the group consisting of 4,4'-diphenyl methane diisocyanate and 4,4'-dicyclohexyl methane diisocyanate; the sulfone diamine is selected from the group consisting of 4,4'-diamino diphenyl sulfone and 3,3'-diamino diphenyl sulfone; and the hydrocarbon diol is selected from the group consisting of ethylene glycol, 1,4-butane diol, 1,5-pentane diol and 1,6-hexane diol.

References Cited

UNITED STATES PATENTS

| | | | |
|---|---|---|---|
| 3,100,721 | 8/1963 | Holden | 260—859 |
| 3,311,527 | 3/1967 | Urbanic | 260—859 |
| 3,350,332 | 10/1967 | Hardy | 260—859 |
| 3,357,939 | 12/1967 | Reischl | 260—859 |

FOREIGN PATENTS

| | | |
|---|---|---|
| 830,226 | 3/1960 | Great Britain. |
| 691,586 | 7/1964 | Canada. |

MURRAY TILLMAN, Primary Examiner

PAUL LIEBERMAN, Assistant Examiner

U.S. Cl. X.R.

260—30.8, 31.2, 32.4, 32.6, 32.8, 33.2, 33.8, 75, 92.7